United States Patent
Greszta-Franz et al.

(10) Patent No.: US 12,338,360 B2
(45) Date of Patent: Jun. 24, 2025

(54) TWO-COMPONENT CLEAR COAT SYSTEMS COMPRISING POLYASPARTIC ACID ESTER

(71) Applicants: COVESTRO INTELLECTUAL PROPERTY GMBH & CO. KG, Leverkusen (DE); COVESTRO DEUTSCHLAND AG, Leverkusen (DE)

(72) Inventors: Dorota Greszta-Franz, Solingen (DE); Jan Weikard, Leverkusen (DE); Holger Mundstock, Wermelskirchen (DE)

(73) Assignee: COVESTRO DEUTSCHLAND AG, Leverkusen (DE)

( * ) Notice: Subject to any disclaimer, the term of this patent is extended or adjusted under 35 U.S.C. 154(b) by 685 days.

(21) Appl. No.: 17/426,767

(22) PCT Filed: Feb. 20, 2020

(86) PCT No.: PCT/EP2020/054418
§ 371 (c)(1),
(2) Date: Jul. 29, 2021

(87) PCT Pub. No.: WO2020/169700
PCT Pub. Date: Aug. 27, 2020

(65) Prior Publication Data
US 2022/0098437 A1    Mar. 31, 2022

(30) Foreign Application Priority Data

Feb. 22, 2019 (EP) .................................... 19158880
Feb. 18, 2020 (EP) .................................... 20157828

(51) Int. Cl.
| | |
|---|---|
| C09D 175/02 | (2006.01) |
| C08G 18/32 | (2006.01) |
| C08G 18/38 | (2006.01) |
| C08G 18/73 | (2006.01) |
| C08G 18/79 | (2006.01) |
| C09D 7/63 | (2018.01) |
| C09D 175/12 | (2006.01) |

(52) U.S. Cl.
CPC ....... C09D 175/12 (2013.01); C08G 18/3821 (2013.01); C08G 18/73 (2013.01); C08G 18/792 (2013.01); C09D 7/63 (2018.01); C08G 18/325 (2013.01); C09D 175/02 (2013.01)

(58) Field of Classification Search
None
See application file for complete search history.

(56) References Cited

U.S. PATENT DOCUMENTS

| | | | |
|---|---|---|---|
| 3,900,687 A * | 8/1975 | Meader, Jr. .......... | C09D 175/04 427/407.1 |
| 4,853,146 A | 8/1989 | Rörig et al. | |
| 5,041,239 A | 8/1991 | Rörig et al. | |
| 5,126,170 A | 6/1992 | Zwiener et al. | |
| 5,214,086 A | 5/1993 | Mormile et al. | |
| 5,243,012 A | 9/1993 | Wicks et al. | |
| 5,364,955 A | 11/1994 | Zwiener et al. | |
| 5,412,056 A | 5/1995 | Zwiener et al. | |
| 5,489,704 A | 2/1996 | Squiller et al. | |
| 5,559,204 A | 9/1996 | Squiller et al. | |
| 5,623,045 A | 4/1997 | Zwiener et al. | |
| 5,821,326 A * | 10/1998 | Kurek .................. | C09D 175/12 528/335 |
| 6,403,699 B1 | 6/2002 | Röckrath et al. | |
| 7,968,212 B2 | 6/2011 | Senkfor et al. | |
| 8,137,813 B2 | 3/2012 | Senkfor et al. | |
| 10,125,290 B2 | 11/2018 | Flosbach et al. | |
| 10,385,231 B2 | 8/2019 | Enkisch-Krug et al. | |
| 11,230,522 B2 * | 1/2022 | Greszta-Franz ... | C08G 18/3821 |
| 2002/0132965 A1 | 9/2002 | Gertzmann et al. | |
| 2009/0226644 A1* | 9/2009 | Wylie .................. | C08G 18/792 427/255.6 |
| 2012/0183692 A1 | 7/2012 | Becker, IV | |
| 2014/0272162 A1 | 9/2014 | Olson | |
| 2016/0024339 A1 | 1/2016 | Squiller et al. | |
| 2016/0237309 A1 | 8/2016 | Shah et al. | |
| 2020/0216383 A1 | 7/2020 | Greszta-Franz et al. | |

FOREIGN PATENT DOCUMENTS

| | | | | |
|---|---|---|---|---|
| CA | 2048444 A1 | 2/1992 | | |
| DE | 19701835 A1 | 7/1998 | | |
| DE | 102006002153 A1 | 7/2007 | | |
| EP | 0249201 A2 | 12/1987 | | |
| EP | 0667362 A1 | 8/1995 | | |
| EP | 0893458 A1 | 1/1999 | | |
| EP | 3061622 A1 * | 8/2016 | ............. | B43L 1/002 |
| WO | 9712945 A1 | 4/1997 | | |
| WO | 2010034109 A1 | 4/2010 | | |
| WO | WO-2014151307 A1 * | 9/2014 | ......... | C08G 18/3256 |
| WO | 2018074884 A1 | 4/2018 | | |
| WO | 2019034586 A1 | 2/2019 | | |

OTHER PUBLICATIONS

Incorez Ltd. Safety Data Sheet for Incozol 2. Jul. 2014. (Year: 2014).*
Houben Weyl, Meth. d. Org. Chemie vol. 11/1, 272 (1957).
Usp. Khim. 1969, 38, 1933.
International Search Report, PCT/EP2020/054418, date of mailing: May 19, 2020, Authorized officer: Sandra Lanz.

* cited by examiner

*Primary Examiner* — Richard A. Huhn
(74) *Attorney, Agent, or Firm* — Richard P. Bender

(57) ABSTRACT

The present invention relates to two-component clear-coat systems comprising polyaspartic esters having primary amino groups and small amounts of dialkyl fumarates, to a process for the production thereof, and to the use thereof in the production of coatings for vehicle repair applications and to substrates coated therewith.

8 Claims, No Drawings

TWO-COMPONENT CLEAR COAT SYSTEMS COMPRISING POLYASPARTIC ACID ESTER

CROSS-REFERENCE TO RELATED APPLICATION

This application is a national stage application under 35 U.S.C. § 371 of PCT/EP2020/054418, filed Feb. 20, 2020, which claims the benefit of European Application No. 19158880.5, filed Feb. 22, 2019, and European Application No. 20157828.3, filed Feb. 18, 2020, each of which is incorporated herein by reference.

The present invention relates to two-component clear-coat systems comprising polyaspartic esters having primary amino groups and containing small amounts of dialkyl fumarates, to a process for the production thereof, and to the use thereof in the production of coatings for vehicle repair applications and to substrates coated therewith.

BACKGROUND

Two-component (2C) coating compositions comprising, as binder, a polyisocyanate component in combination with a component that is reactive towards isocyanate groups, in particular a polyhydroxyl component, have long been known. They are suitable for the production of high-quality coatings that can be tailored to make them hard, elastic, resistant to abrasion and solvents and, above all, weather-resistant.

Within this 2C polyurethane coating technology, certain ester-containing secondary polyamines have become established in recent years that, in combination with paint polyisocyanates, are particularly suitable as binders in low-solvent or solvent-free (high-solids) coating compositions and allow rapid curing of the coatings at low temperatures, such as is required in vehicle repair applications.

These secondary polyamines are so-called polyaspartic esters, as described for example in EP0403921. The use thereof either alone or in a mixture with further components in 2C coating compositions that are reactive towards isocyanate groups is described for example in EP0403921, EP0639628, EP0667362, EP0689881, U.S. Pat. No. 5,214,086, EP0699696, EP0596360, EP0893458, DE19701835 and U.S. Pat. No. 5,243,012. EP0470461 describes a coating for vehicle repair applications comprising a polyisocyanate component and an isocyanate-reactive secondary diamine prepared from 3,3'-dimethyl-4,4'-diaminodicyclohexylmethane and diethyl maleate. The isocyanate-reactive component additionally comprises a hydroxyl-functional polyhydroxypolyacrylate component or mixtures of polyhydroxypolyacrylates and polyester polyols.

WO2015130501 and WO2015130502 disclose polyaspartic ester compositions that contain between 15 and 30% of aspartic esters having primary amino groups (measured as area % in the gas chromatogram). However, neither document identifies any advantage arising from an increased content of aspartic esters containing primary amino groups, and polyaspartic ester compositions having an acceptable pot life were achieved only by further reaction with preferably cycloaliphatic polyisocyanates. Given the conventional production process, the coating compositions thus produced can be assumed not to have a reduced content of diethyl fumarate.

The preparation of amino-functional aspartic esters is known in principle. The synthesis is carried out through addition of primary polyamines to an activated carbon double bond of vinylogous carbonyl compounds, as present for example in maleic or fumaric esters, which is adequately described in the literature (Houben Weyl, Meth. d. Org. Chemie vol. 11/1, 272 (1957), Usp. Khim 1969, 38, 1933). If only one amino group of the polyamine has reacted with the double bond of the vinylogous carbonyl compounds, this reaction can result in the formation, as a side product, of a polyaspartic ester having primary amino groups. In the commercially available polyaspartic esters, maleic ester is used as the vinylogous carbonyl compound. During preparation of a polyaspartic ester based on maleic esters, a retro-Michael addition can occur as a further undesired side reaction in which elimination of the polyamine results in the formation of dialkyl fumarate as a minor component. A typical production process for a polyaspartic ester therefore requires a storage time of 4-6 weeks once most of the reactants have reacted with each other. During this time, the product undergoes so-called maturation, which is manifested by stabilization of the viscosity. Because conversion continues to increase during this time, the dialkyl fumarate content falls too. This storage over several weeks incurs significant logistics costs during production. Although the product is not shipped to the customer until the end of the storage period, it invariably still contains substantial amounts of dialkyl fumarate, which can cause severe sensitization. Diethyl fumarate, for example, is classified as a VOC (volatile organic compound) and thus prevents provision of VOC-free coatings. Another disadvantage resulting from the presence of dialkyl fumarates is the lowering of the glass transition temperature of a coating film as a consequence of the plasticizing effect thereof.

There are in theory two options for modifying the process for producing polyaspartic ester compositions in order to give rise to polyaspartic ester compositions that are not subject to the above-mentioned disadvantages. The reaction time may be prolonged or the reaction temperature increased. The former is discounted on economic grounds. On the other hand, raising the reaction temperature for example to 100° C., or even to 80° C., leads to dramatic yellowing of the product.

EP0816326 discloses a process for accelerating the addition of the polyamine to dialkyl maleate and for reducing the dialkyl fumarate content through the addition of a specific catalyst. Since the need for storage cannot be averted despite the use of a catalyst, this approach does not lead to an ultimately satisfactory result. EP 1197507 describes the addition of thiol compounds as scavengers for dialkyl fumarates. Because thiol compounds are known to cause a considerable odour nuisance, this is not a solution that can be implemented in practice either.

A theoretical option for distillative workup is mentioned for example in EP0403921. This describes a removal of dialkyl fumarate by distillation in a process in which an excess of dialkyl maleate is used. This disclosure does not give any examples or specify a method of distillation. Since an excess of diethyl maleate is used in this process, the worked-up product is not expected to contain significant amounts of polyaspartic esters having primary amino groups. This method has not gained acceptance, because the excessive amount of diethyl maleate used results in poor space-time yield and much waste, which is not economically justifiable.

DE102006002153 likewise describes a product that is produced using an excess of dialkyl maleate and subsequent removal of dialkyl fumarate by distillation. This is a diaspartic ester that is free of primary amino groups.

WO2018/074884, which had not yet been published as a patent at the time of the application for the present invention, likewise describes the distillation of polyaspartic esters and a very general description of the use thereof in coating compositions. There are no descriptions of clear coats in which water scavengers and/or hydrolysis stabilizers are mandatory.

The polyaspartic ester-based coating compositions disclosed in the prior art have fast curing times alongside adequate pot life and are characterized by good mechanical and optical properties. However, it is known to those skilled in the art that the action of moisture on such coating compositions tends to cause defects in adhesion and interlayer adhesion in multilayer structures. In vehicle repair work, this sensitivity to moisture means that coated parts need to be stored for long periods before they can be fitted in a vehicle.

DETAILED DESCRIPTION

It is thus an object of the present invention to provide a polyaspartic ester-based coating composition having a balanced drying performance, i.e. with fast curing times allied with adequate pot life, which additionally results in coatings having improved water resistance.

The object of the present invention was able to be achieved by the provision of two-component coating compositions (2C coating compositions) comprising polyaspartic esters having primary amino groups and small amounts of dialkyl fumarates.

The present invention relates to two-component coating compositions (2C coating compositions) comprising
 a) at least one polyaspartic ester-containing component A,
 b) at least one polyisocyanate component B,
 c) optionally one or more components C that are different from A and are reactive towards isocyanate groups,
 d) at least one water scavenger and/or hydrolysis stabilizer (component D1) and optionally other auxiliaries and additives (component D2).

In the context of the present invention, polyaspartic ester-containing components A are compositions comprising one or more polyaspartic esters of the general formula (I)

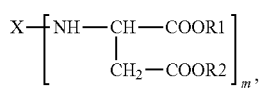

in which
 X is an m-valent organic radical, optionally containing one or more heteroatoms, as can be obtained by removing the primary amino groups from a corresponding polyamine that has (cyclo)aliphatically or araliphatically attached primary amino groups and is in the molecular weight range from 60 to 6000 g/mol, and which may contain further functional groups that are reactive towards isocyanate groups and/or inert at temperatures of up to 100° C.,
 R1 and R2 are identical or different organic radicals each having 1 to 18 carbon atoms,
 m is an integer >1,
and
one or more polyaspartic esters having a primary amino group that are of the general formula (II)

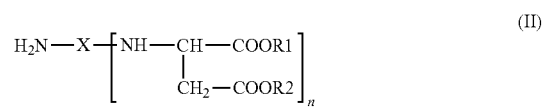

in which
 n is m-1,
 X and radicals R1 and R2 have the meanings defined above,
characterized in that the proportion of compounds of the general formula (II) corresponds to ≥4% to ≤20% of the area by GC (measured as area % in the gas chromatogram), wherein the sum of the areas by GC of compounds of the two general formulas (I) and (II) is 100% and dialkyl fumarates are present in component A in amounts from ≥0.01% to ≤1.2% by weight based on the total weight of component A.

Polyaspartic ester-containing components A are preferably compositions comprising one or more polyaspartic esters of the general formulas (I) and (II) in which R1 and R2 are identical or different alkyl radicals each having 1 to 18 carbon atoms, preferably identical or different alkyl radicals each having 1 to 8 carbon atoms, and most preferably in each case alkyl radicals such as methyl, ethyl, propyl, isopropyl, butyl or isobutyl radicals. Most preferred is ethyl.

Polyaspartic ester-containing components A are compositions comprising one or more polyaspartic esters of the general formulas (I) and (II), in which X is organic radicals obtained by removing the primary amino groups from a corresponding polyamine that has (cyclo)aliphatically or araliphatically attached primary amino groups, selected from the following group: all known polyamines having primary amino groups that conform to the general formula (III). Examples include the following compounds: ethylenediamine, 1,2-diaminopropane, 1,4-diaminobutane, 1,5-diaminopentane, 2,5-diamino-2,5-dimethylhexane, 1,5-diamino-2-methylpentane (Dytek® A, from DuPont), 1,6-diaminohexane, 2,2,4- and/or 2,4,4-trimethyl-1,6-diaminohexane, 1,11-diaminoundecane, 1,12-diaminododecane or triaminononane, etheramines such as 4,9-dioxadodecane-1,12-diamine, 4,7,10-trioxatridecane-1,13-diamine or higher-molecular-weight polyether polyamines having aliphatically attached primary amino groups, for example those marketed under the Jeffamine® name by Huntsman. Also employable are aliphatic polycyclic polyamines such as tricyclodecanebismethylamine (TCD diamine) or bis(aminomethyl)norbornanes, amino-functional siloxanes, for example diaminopropylsiloxane G10 DAS (from Momentive), oleoalkyl-based amines, for example Fentamine from Solvay, dimeric fatty acid diamines such as Priamine from Croda.

Polyaspartic ester-containing components A are preferably compositions comprising one or more polyaspartic esters of the general formulas (I) and (II), in which X is organic radicals obtained by removing the primary amino groups from one of the polyamines of the general formula (III) in which m=2 and X is a cyclic hydrocarbon radical containing at least one cyclic carbon ring. Examples of diamines that may be used with particular preference are 1-amino-3,3,5-trimethyl-5-aminomethylcyclohexane (IPDA), 2,4- and/or 2,6-hexahydrotolylenediamine (H6-TDA), isopropyl-2,4-diaminocyclohexane and/or isopropyl-2,6-diaminocyclohexane, 1,3-bis(aminomethyl)cyclohexane, 2,4'-, and/or 4,4'-diaminodicyclohexylmethane, 3,3'-dimethyl-4,4'-diaminodicyclohexylmethane (Laromin® C 260, BASF AG), the isomeric diaminodicyclohexylmethanes substituted in the ring with a methyl group (=C-monomethyl-diaminodicyclohexylmethanes), 3(4)-aminomethyl-1-methylcyclohexylamine (AMCA) and also araliphatic diamines such as 1,3-bis(aminomethyl)benzene or m-xylylenediamine Polyaspartic ester-containing components A are likewise preferably compositions comprising one or more polyaspartic esters of the general formulas (I) and (II), in which X is organic radicals obtained by removing the primary amino groups from one of the polyamines of the general formula (III), selected from the group: polyether polyamines having aliphatically attached primary amino groups, 1,2-diaminopropane, 1,4-diaminobutane, 1,6-diaminohexane, 1,5-diamino-2-methylpentane, 2,5-diamino-2,5-dimethylhexane, 2,2,4- and/or 2,4,4-trimethyl-1,6-diaminohexane, 1,11-diaminoundecane, 1,12-diaminododecane, 1-amino-3,3,5-trimethyl-5-aminomethylcyclohexane, 2,4- and/or 2,6-hexahydrotolylenediamine, 1,5-diaminopentane, 2,4'- and/or 4,4'-diaminodicyclohexylmethane or 3,3'-dimethyl-4,4'-diaminodicyclohexylmethane. Particular preference is given to 3,3'-dimethyl-4,4'-diaminodicyclohexylmethane, 1,5-diaminopentane, 2,4'- and/or 4,4'-diaminodicyclohexylmethane, 1,5-diamino-2-methylpentane, and very particular preference to using 2,4'- and/or 4,4'-diaminodicyclohexylmethane.

Polyaspartic ester-containing components A are particularly preferably compositions comprising one or more polyaspartic esters of the general formulas (I) and (II), in which X is organic radicals obtained by removing the primary amino groups from one of the polyamines of the general formula (III), selected from the group: polyether polyamines having aliphatically attached primary amino groups, 1,2-diaminopropane, 1,4-diaminobutane, 1,5-diaminopentane, 1,6-diaminohexane, 1,5-diamino-2-methylpentane, 2,5-diamino-2,5-dimethylhexane, 2,2,4- and/or 2,4,4-trimethyl-1,6-diaminohexane, 1,11-diaminoundecane, 1,12-diaminododecane, 1-amino-3,3,5-trimethyl-5-aminomethylcyclohexane, 2,4- and/or 2,6-hexahydrotolylenediamine, 2,4'- and/or 4,4'-diaminodicyclohexylmethane or 3,3'-dimethyl-4,4'-diaminodicyclohexylmethane.

Polyaspartic ester-containing components A are very particularly preferably compositions comprising one or more polyaspartic esters of the general formulas (I) and (II), in which X is organic radicals obtained by removing the primary amino groups from one of the polyamines of the general formula (III), selected from the group: 3,3'-dimethyl-4,4'-diaminodicyclohexylmethane, 2,4'- and/or 4,4'-diaminodicyclohexylmethane, 1,5-diamino-2-methylpentane. Index m is an integer >1 and preferably 2.

Polyaspartic ester-containing components A are preferably compositions comprising one or more polyaspartic esters of the general formulas (I) and (II) in which the proportion of compounds of the general formula (II) is ≥4% to ≤20%, preferably >4% to ≤20%, particularly preferably ≥5% to ≤20%, more preferably ≥5.3% to ≤20%, most preferably ≥5.3% to ≤15%, of the area by GC (measured as area % in the gas chromatogram), wherein the sum of the areas by GC of the compounds of the two general formulas (I) and (II) is 100%.

Polyaspartic ester-containing components A are preferably compositions comprising one or more polyaspartic esters of the general formulas (I) and (II) in which the proportion of dialkyl fumarates is ≥0.01% to ≤1.2% by weight, preferably ≥0.01% to ≤1% by weight, more preferably ≥0.01% to ≤0.1% by weight, based on the total weight of component A.

Polyaspartic ester-containing components A are particularly preferably compositions comprising one or more polyaspartic esters of the general formula (I), in which
X is an m-valent organic radical, optionally containing one or more heteroatoms, as obtained by removing primary amino groups from polyether polyamines having aliphatically attached primary amino groups, 1,2-diaminopropane, 1,4-diaminobutane, 1,5-diaminopentane, 1,6-diaminohexane, 1,5-diamino-2-methylpentane, 2,5-diamino-2,5-dimethylhexane, 2,2,4- and/or 2,4,4-trimethyl-1,6-diaminohexane, 1,11-diaminoundecane, 1,12-diaminododecane, 1-amino-3,3,5-trimethyl-5-aminomethylcyclohexane, 2,4- and/or 2,6-hexahydrotolylenediamine, 2,4'- and/or 4,4'-diaminodicyclohexylmethane or 3,3'-dimethyl-4,4'-diaminodicyclohexylmethane,
R1 and R2 are identical or different alkyl radicals each having 1 to 8 carbon atoms,
m is an integer >1,
and
one or more polyaspartic esters having a primary amino group that are of the general formula (II), in which
n is m-1,
X and radicals R1 and R2 have the meanings defined above,
characterized in that the proportion of compounds of the general formula (II) corresponds to ≥4% to ≤20% of the area by GC (measured as area % in the gas chromatogram), wherein the sum of the areas by GC of compounds of the two general formulas (I) and (II) is 100% and dialkyl fumarates are present in component A in amounts from ≥0.01% to ≤1.2% by weight based on the total weight of component A.

Polyaspartic ester-containing components A are most preferably compositions comprising one or more polyaspartic esters of the general formula (I) in which
X is an m-valent organic radical as can be obtained by removing primary amino groups from 3,3'-dimethyl-4,4'-diaminodicyclohexylmethane, 2,4'- and/or 4,4'-diaminodicyclohexylmethane, 1,5-diamino-2-methylpentane,
R1 and R2 are identical or different alkyl radicals selected from the group consisting of methyl, ethyl, propyl, isopropyl, butyl or isobutyl radicals,
m is 2,
and
one or more polyaspartic esters having a primary amino group that are of the general formula (II), in which
n is m-1,
X and radicals R1 and R2 have the meanings defined above,
characterized in that the proportion of compounds of the general formula (II) corresponds to >4% to ≤20% of the area by GC (measured as area % in the gas chromatogram), wherein the sum of the areas by GC of compounds of the two general formulas (I) and (II) is 100% and dialkyl fumarates are present in component A in amounts from ≥0.01% to ≤1% by weight based on the total weight of component A.

Polyaspartic ester-containing components A are even more preferably compositions comprising one or more polyaspartic esters of the general formula (I), in which
X is an m-valent organic radical as can be obtained by removing primary amino groups from 3,3'-dimethyl-4,4'-diaminodicyclohexylmethane, 2,4'- and/or 4,4'-diaminodicyclohexylmethane,
R1 and R2 are ethyl radicals,
m is 2, and
one or more polyaspartic esters having a primary amino group that are of the general formula (II), in which
   n is m-1,
   X and radicals R1 and R2 have the meanings defined above,
characterized in that the proportion of compounds of the general formula (II) corresponds to ≥5% to ≤20% of the area by GC (measured as area % in the gas chromatogram), wherein the sum of the areas by GC of compounds of the two general formulas (I) and (II) is 100% and dialkyl fumarates are present in component A in amounts from ≥0.01% to ≤0.1% by weight based on the total weight of component A.

Polyaspartic ester-containing components A are preferably compositions comprising one or more polyaspartic esters of the general formula (I) and formula (II) that have a platinum-cobalt colour index ≤100, more preferably ≤50. The platinum-cobalt colour index is measured in accordance with DIN EN ISO 6271:2016-05.

Polyaspartic ester-containing components A as described above can be prepared by the following process:

Reaction of polyamines of the general formula (III),

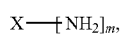 (III)

where X
   is an m-valent organic radical, optionally containing one or more heteroatoms, as can be obtained by removing the primary amino groups from a polyamine that has (cyclo)aliphatically or araliphatically attached primary amino groups and is in the molecular weight range from 60 to 6000 g/mol, and which may contain further functional groups that are reactive towards isocyanate groups and/or inert at temperatures of up to 100° C.,
   m is an integer >1, preferably 2,
with compounds of the general formula (IV)

 (IV), where R1 and R2
   are identical or different organic radicals, preferably identical or different alkyl radicals each having 1 to 18 carbon atoms, more preferably identical or different alkyl radicals each having 1 to 8 carbon atoms, very particularly preferably in each case alkyl radicals such as methyl, ethyl, propyl, isopropyl, butyl or isobutyl radicals and most preferably ethyl,
and removal by distillation of the unreacted fraction of the compound of the general formula (IV), The process described above for the preparation of polyaspartic ester-containing components A is preferably carried out in two steps. In the first step, the compounds of the general formula (III) and (IV) are reacted at temperatures between 0° C. and 100° C., preferably 20 to 80° C., and more preferably 20 to 60° C., in a ratio of equivalents of primary amino groups in the compounds of the general formula (III) to C=C double bond equivalents in the compounds of the general formula (IV) of 1:1.2 to 1.2:1, but preferably 1:1.05 to 1.05:1, until the residual content of compounds of the general formula (IV) is from 2 to 15 percent by weight, preferably from 3 to 10 percent by weight.

In the second step, the unreacted fraction of the compounds of the general formula (IV) is removed by distillation.

Suitable conditions during the distillation are a pressure range between 0.01 and 2 mbar and a temperature of the bottom outflow on exiting the distillation apparatus of ≤170° C. and ≥ the temperature resulting from the following formula (V):

$$T(\text{bottom outflow}) = 27 \times ln(p) + 150 \qquad (V)$$

where T(bottom outflow) is the temperature of the bottom outflow in ° C. and
   P is the pressure in the distillation apparatus in mbar.

Maintaining this pressure range ensures not only that moderate temperatures in the bottom outflow are sufficient for depletion of the dialkyl fumarate content to the desired extent, but that the process remains usable on an industrial scale. At lower pressure, the gas density becomes too low and the necessary apparatus consequently so large that the process becomes economically disadvantageous.

The temperature of the bottom outflow is preferably ≤170° C., but at least 20 K above the temperature resulting from formula (V); more preferably it is between 20 K and 40 K above the temperature resulting from formula (V), but not higher than 170° C.

Compounds of the general formula (III) that can be used in the process described above are all known polyamines having primary amino groups that conform to the general formula (III). Examples include the following compounds: ethylenediamine, 1,2-diaminopropane, 1,4-diaminobutane, 1,5-diaminopentane, 2,5-diamino-2,5-dimethylhexane, 1,5-diamino-2-methylpentane (Dytek® A, from DuPont), 1,6-diaminohexane, 2,2,4- and/or 2,4,4-trimethyl-1,6-diaminohexane, 1,11-diaminoundecane, 1,12-diaminododecane or triaminononane, etheramines such as 4,9-dioxadodecane-1,12-diamine, 4,7,10-trioxatridecane-1,13-diamine, or higher-molecular-weight polyether polyamines having aliphatically attached primary amino groups, for example those marketed under the Jeffamine® name by Huntsman. Also employable are aliphatic polycyclic polyamines such as tricyclodecanebismethylamine (TCD diamine) or bis(aminomethyl) norbornanes, amino-functional siloxanes, for example diaminopropylsiloxane G10 DAS (from Momentive), oleoalkyl-based amines, for example Fentamine from Solvay, dimeric fatty acid diamines such as Priamine from Croda.

In the process described above, preference is given to using polyamines of the general formula (III) in which m=2 and X is a cyclic hydrocarbon radical having at least one cyclic carbon ring. Examples of diamines that may be used with particular preference are 1-amino-3,3,5-trimethyl-5-aminomethylcyclohexane (IPDA), 2,4- and/or 2,6-hexahydrotolylenediamine (H6-TDA), isopropyl-2,4-diaminocyclohexane and/or isopropyl-2,6-diaminocyclohexane, 1,3-bis(aminomethyl)cyclohexane, 2,4'-, and/or 4,4'-diaminodicyclohexylmethane, 3,3'-dimethyl-4,4'-diaminodicyclohexylmethane (Laromin® C 260, BASF AG), the isomeric diaminodicyclohexylmethanes substituted in the ring with a methyl group (=C-monomethyl-diaminodicyclohexylmethanes), 3 (4)-aminomethyl-1-methylcyclohexylamine (AMCA), and also araliphatic diamines such as 1,3-bis(aminomethyl)benzene or m-xylylenediamine In the process according to the invention, preference is also given to using polyamines of the general formula (III) selected from the group: polyether polyamines having aliphatically attached primary amino groups, 1,2-diaminopropane, 1,4-diaminobutane, 1,5-diaminopentane, 1,6-diaminohexane, 1,5-diamino-2-methylpentane, 2,5-diamino-2,5-dimethylhexane, 2,2,4- and/or 2,4,4-trimethyl-1,6- diaminohexane, 1,11-diaminoundecane, 1,12-diaminododecane, 1-amino-3,3,5-trimethyl-5-aminomethylcyclohexane, 2,4- and/or 2,6-hexahydrotolylenediamine, 2,4'- and/or 4,4'-diaminodicyclohexylmethane or 3,3'-dimethyl-4,4'-diaminodicyclohexylmethane. Particular preference is given to 3,3'-dimethyl-4,4'-diaminodicyclohexylmethane, 2,4'- and/or 4,4'-diaminodicyclohexylmethane, 1,5-diamino-2-methylpentane, and very particular preference to using 2,4'- and/or 4,4'-diaminodicyclohexylmethane.

In the process according to the invention, particular preference is given to using polyamines of the general formula (III) selected from the group: polyether polyamines having aliphatically attached primary amino groups, 1,2-diaminopropane, 1,4-diaminobutane, 1,5-diaminopentane, 1,6-diaminohexane, 1,5-diamino-2-methylpentane, 2,5-diamino-2,5-dimethylhexane, 2,2,4- and/or 2,4,4-trimethyl-1,6-diaminohexane, 1,11-diaminoundecane, 1,12-diaminododecane, 1-amino-3,3,5-trimethyl-5-aminomethylcyclohexane, 2,4- and/or 2,6-hexahydrotolylenediamine, 2,4'- and/or 4,4'-diaminodicyclohexylmethane or 3,3'-dimethyl-4,4'-diaminodicyclohexylmethane.

Very particular preference is given to using, in the process according to the invention, polyamines of the general formula (III) selected from the group 3,3'-dimethyl-4,4'-diaminodicyclohexylmethane, 2,4'- and/or 4,4'-diaminodicyclohexylmethane and 1,5-diamino-2-methylpentane.

Preferred compounds of the general formula (IV) that are used in the process described above are maleic or fumaric esters of the general formula (IV) in which R1 and R2 are identical or different organic radicals each having 1 to 18 carbon atoms. Preferably, R1 and R2 are independently linear or branched alkyl radicals having 1 to 8 carbon atoms, more preferably are each alkyl radicals such as methyl, ethyl, propyl, isopropyl, butyl or isobutyl radicals and particularly preferably ethyl.

Examples of compounds of the general formula (IV) include the following compounds: dimethyl maleate, diethyl maleate, di-n-propyl or diisopropyl maleate, di-n-butyl maleate, di-2-ethylhexyl maleate or the corresponding fumaric esters. Very particular preference is given to diethyl maleate.

The two-component coating compositions according to the invention comprise at least one polyisocyanate component B.

Suitable polyisocyanate components B are organic polyisocyanates having an average NCO functionality of at least 2 and a molecular weight of at least 140 g/mol. Particularly well suited are unmodified organic polyisocyanates in the molecular weight range from 140 to 300 g/mol, paint polyisocyanates in the molecular weight range from 300 to 1000 g/mol and NCO prepolymers having urethane, urea and/or allophanate groups and a molecular weight above 400 g/mol, or mixtures thereof.

In the context of the invention, the term "paint polyisocyanates" is understood as meaning compounds or mixtures of compounds that can be obtained from simple polyisocyanates by an oligomerization reaction known per se. Examples of suitable oligomerization reactions are carbodiimidization, dimerization, trimerization, biuretization, urea formation, urethanization, allophanatization and/or cyclization with formation of oxadiazine structures. Oligomerization may consist of more than one of the above-mentioned reactions performed simultaneously or in succession.

The "paint polyisocyanates" are preferably biuret polyisocyanates, polyisocyanates containing isocyanurate groups, mixtures of polyisocyanates containing isocyanurate and uretdione groups, polyisocyanates containing urethane and/or allophanate groups, or mixtures of polyisocyanates containing isocyanurate and allophanate groups based on simple organic polyisocyanates.

Likewise suitable as polyisocyanate component B are prepolymers containing isocyanate groups that are known per se and based on simple organic polyisocyanates and/or based on paint polyisocyanates on the one hand and organic polyhydroxy compounds having a molecular weight above 300 g/mol on the other hand. Whereas the paint polyisocyanates containing urethane groups are derivatives of low-molecular-weight polyols in the molecular weight range from 62 to 300 g/mol, suitable polyols being, for example, ethylene glycol, propylene glycol, trimethylolpropane, glycerol or mixtures of these alcohols, the prepolymers containing isocyanate groups are prepared using polyhydroxy compounds having a molecular weight above 300 g/mol, preferably above 400 g/mol, more preferably between 400 and 8000 g/mol. Such polyhydroxyl compounds are in particular those having 2 to 6, preferably 2 to 3, hydroxyl groups per molecule and are selected from the group consisting of ether, ester, thioether, carbonate and polyacrylate polyols and mixtures of such polyols.

In the preparation of the prepolymers containing isocyanate groups, the mentioned higher-molecular-weight polyols may also be used in the form of mixtures with the mentioned low-molecular-weight polyols, giving rise directly to mixtures of low-molecular-weight paint polyisocyanates containing urethane groups and higher-molecular-weight NCO prepolymers that are likewise suitable as polyisocyanate component b) according to the invention.

For the preparation of the prepolymers containing isocyanate groups or mixtures thereof with paint polyisocyanates, simple organic polyisocyanates of the type mentioned by way of example below or paint polyisocyanates are reacted with higher-molecular-weight hydroxyl compounds or mixtures thereof with low-molecular-weight polyhydroxyl compounds of the type mentioned by way of example, while maintaining an NCO/OH equivalents ratio of 1.1:1 to 40:1, preferably 2:1 to 25:1, with urethane and/or allophanate formation. If using an excess of a distillable simple organic polyisocyanate, this may optionally be removed after the reaction by distillation, with the result that NCO prepolymers containing monomer-free isocyanate groups are present that may likewise be used as polyisocyanate component b).

Examples of suitable simple organic polyisocyanates are 1,4-diisocyanatobutane, 1,5-diisocyanatopentane, 1,6-diisocyanatohexane (HDI), 1,5-diisocyanato-2,2-dimethylpentane, 2,2,4- and 2,4,4-trimethyl-1,6-diisocyanatohexane, tetramethylxylylene diisocyanate (TMXDI) 1-isocyanato-3,3,5-trimethyl-5-isocyanatomethylcyclohexane (isophorone diisocyanate, IPDI), 1-isocyanato-1-methyl-4(3)-isocyanatomethylcyclohexane, dicyclohexylmethane 2,4'-diisocyanate and/or 4,4'-diisocyanate, 1,10-diisocyanatodecane, 1,12-diisocyanatododecane, cyclohexane 1,3- and 1,4-diisocyanate, xylylene diisocyanate isomers, triisocyanatononane (TIN), naphthylene 1,5-diisocyanate, 2,4-diisocyanatotoluene or mixtures thereof with 2,6-diisocyanatotoluene preferably containing, based on mixtures, up to 35% by weight of 2,6-diisocyanatotoluene, 2,2'-, 2,4'-, 4,4'-diisocyanatodiphenylmethane or technical polyisocyanate mixtures of the diphenylmethane series, or any desired mixtures of the polyisocyanates mentioned.

Preference here is given to using aliphatic, cycloaliphatic or araliphatic polyisocyanates selected from the group 1,4-diisocyanatobutane, 1,5-diisocyanatopentane, 1,6-diisocyanatohexane (HDI), 1,5-diisocyanato-2,2-dimethylpentane, 2,2,4- or 2,4,4-trimethyl-1,6-diisocyanatohexane, tetramethylxylylene diisocyanate (TMXDI) 1-isocyanato-3,3,5-trimethyl-5-isocyanatomethylcyclohexane (isophorone diisocyanate, IPDI), 1-isocyanato-1-methyl-4(3)-isocyanatomethylcyclohexane, dicyclohexylmethane 2,4'- and/or 4,4'-diisocyanate, 1,10-diisocyanatodecane, 1,12-diisocyanatododecane, cyclohexane 1,3- and 1,4-diisocyanate, xylylene diisocyanate isomers, triisocyanatononane (TIN), or any desired mixtures of such polyisocyanates.

In principle, it is of course also possible to use mixtures of different polyisocyanate components of the type mentioned above.

In addition to the polyaspartic ester-containing component A, the two-component composition according to the invention may comprise further components (components C) that are reactive towards isocyanate groups.

These may, for example, be low-molecular-weight polyols in the molecular weight range from 62 to 300 g/mol, for example ethylene glycol, propylene glycol, trimethylolpropane, glycerol or mixtures of these alcohols, or polyhydroxy compounds having a molecular weight above 300 g/mol, preferably above 400 g/mol, more preferably between 400 and 20000 g/mol. Such polyhydroxyl compounds are in particular those having 2 to 6, preferably 2 to 3, hydroxyl groups per molecule and are selected from the group consisting of ether, ester, thioether, polyurethane, carbonate and polyacrylate polyols and mixtures of such polyols.

In addition, the two-component composition according to the invention comprises at least one water scavenger and/or hydrolysis stabilizer (component D1).

Suitable water scavengers are, for example, triethyl orthoformate, toluenesulfonyl isocyanate, monooxazolidines or molecular sieves, and suitable hydrolysis stabilizers are, for example, carbodiimides.

In addition, the composition according to the invention may comprise further auxiliaries and additives typical for coating technology with polyisocyanate polyaddition compounds, and for polyurethane compounds in particular (component D2). Examples are catalysts/activators such as titanium-, zirconium-, bismuth-, tin- and/or iron-containing catalysts, as described, for example, in WO 05058996. It is also possible to add amines or amidines.

Examples of other suitable auxiliaries and additives D2 are in particular light stabilizers such as UV absorbers and sterically hindered amines (HALS), and also stabilizers, defoaming agents, anticratering and/or wetting agents, levelling agents, film-forming auxiliaries, reactive diluents, biocides, solvents or substances for rheology control.

The use of light stabilizers, especially of UV absorbers, for example substituted benzotriazoles, S-phenyltriazines or oxalanilides, and of sterically hindered amines, especially those having a 2,2,6,6-tetramethylpiperidyl structure—referred to as HALS—is described by way of example in A. Valet, Lichtschutzmittel für Lacke [Light stabilizers for paints], Vincentz Verlag, Hanover, 1996.

Stabilizers, for example free-radical scavengers, and other polymerization inhibitors such as sterically hindered phenols stabilize paint components during storage and are intended to prevent discolouration during curing. Wetting and levelling agents improve surface wetting and/or the levelling of coatings. Examples are fluorosurfactants, silicone surfactants and specific polyacrylates. Rheology-control additives are important in order to control the properties of the two-component system on application and in the levelling phase on the substrate and are disclosed, for example, in patent specifications WO 9422968, EP0276501, EP0249201 or WO 9712945.

The composition may comprise solvents. The solvent may be an organic solvent or a mixture of organic solvents, or water or a mixture of organic solvent(s) and water. Suitable solvents should be used in a manner known to those skilled in the art, with this use tailored to the composition and to the application process. Solvents are intended to dissolve the components used and promote the mixing thereof, and to avoid incompatibilities. In addition, during application and curing, they should escape from the coating in a manner tailored to the crosslinking reaction in progress so as to afford a solvent-free coating of optimal appearance and free of defects such as popping or pinholes. Suitable solvents include in particular those used in two-component technology. Examples of organic solvents are ketones such as acetone, methyl ethyl ketone or hexanone, esters such as ethyl acetate, butyl acetate, methoxypropyl acetate, substituted glycols and other ethers, aromatics such as xylene or solvent naphtha, for example from Exxon-Chemie, and mixtures of the solvents mentioned. When the NCO-reactive component of the composition is in the form of an aqueous dispersion, water is also suitable as solvent or diluent.

The ratio of polyisocyanate component B to polyaspartic ester-containing component A in the composition, based on the molar amounts of polyisocyanate groups in relation to NCO-reactive groups, is preferably from 0.5:1.0 to 3.0:1.0. Particular preference is given to a ratio of 0.9:1.0 to 1.5:1.0 Very particular preference is given to a ratio of 1.05:1.0 to 1.25:1.0

The two-component composition according to the invention is preferably not a foamable or foam-forming composition. The composition is preferably not radically polymerizable, especially not photopolymerizable, i.e. the composition does not cure through radical processes, especially not through radical polymerization processes initiated by actinic radiation.

The two-component coating composition according to the invention is produced by methods known per se in paint technology.

An isocyanate-reactive (R) and an isocyanate-containing component (H) are first prepared separately by mixing the respective isocyanate-reactive components A and C or by mixing the respective polyisocyanate components B. The auxiliaries and additives D1 and D2 are preferably admixed with the isocyanate-reactive component R. The components R and H thus produced are not mixed until immediately before or during application. Where mixing takes place before application, it should be noted that the reaction of the constituents commences immediately after mixing. The rate of the reaction varies according to the choice of components and additives. The processing time within which the composition must be applied is also known as the pot life and is defined as the time from mixing of the components until doubling of the flow time; depending on the choice of components, this is in the range from 1 minute to 24 hours, usually in the range from 10 minutes to 8 hours. The pot life is determined by methods known to those skilled in the art.

The invention also relates to a process for producing a coating on a substrate comprising at least the following steps:
 i) applying the two-component coating composition described above to at least part of a substrate to be coated and
 ii) curing the coating composition from step i).

The present invention accordingly further provides for the use of the two-component coating compositions according to the invention in the production of coatings on substrates, the process described above for coating a substrate, and the coated substrates themselves that are obtainable in this way.

The substrates may have already been coated wholly or partly with one or more coating layers. These coating layers may still be uncured or wet, partly cured or fully cured; the further coating layers on the substrate are preferably partly cured or fully cured. Examples of coating layers are priming coats, primers, fillers, spackling coats, basecoats, or substrates that have already been fully painted and are being recoated after possible pretreatment such as sanding or plasma activation. Especially suitable are substrates such as those occurring in refinishing or finishing in renovation or maintenance work, for example in vehicles, especially in ships, aircraft, motor vehicles such as automobiles, lorries, coaches, large vehicles, rail vehicles.

The present invention accordingly further provides preferably for the use of the two-component coating compositions described above in the production of clear coats on substrates, in particular those occurring in refinishing or finishing in renovation or maintenance work, especially in vehicles, the process described above for coating these specific substrates, and the coated substrates themselves that are obtainable in this way.

The coating composition may be applied by customary application methods. Examples of application methods are brushing, roller application, knife application, dipping and spraying, with preference given to spray application. After an optional flash-off time, application is followed by the curing and drying of the composition according to the invention on the substrate or object. This is carried out according to methods that are customary in coating technology, either under ambient conditions (temperature and atmospheric humidity) or under forced conditions, for example by raising the oven temperature, using radiation such as infrared, near-infrared or microwave radiation, and using dehumidified and/or heated air or other gases. This is preferably done without using devices for forced curing. The applied coating composition is cured, for example, at temperatures from −20 to 100° C., preferably from −10 to 80° C., more preferably from 0 to 60° C. and most preferably from 10 to 40° C. Although not preferred, lower curing temperatures may also be employed, but will result in longer curing times.

It is likewise possible, although not preferred, to cure the composition at higher temperatures, for example 80 to 160° C. or higher.

After the first coating layer has cured, a further coating layer may be applied and likewise cured.

The invention further provides for the use of the two-component coating composition according to the invention in the production of water-resistant coatings.

EXPERIMENTAL SECTION

Raw Materials and Substrates

PACM 20: A mixture of 2,4- and 4,4'-diaminodicyclohexylmethane, manufacturer: Evonik
Desmodur N 3900: A low-viscosity HDI trimer containing approx. 23.5% NCO, manufacturer: Covestro
Byk 331: Polyether-modified polydimethylsiloxane surface additive, manufacturer: Byk
Tinuvin 384-2: Benzenepropanoic acid, 3-(2H-benzotriazol-2-yl)-5-(1,1-dimethylethyl)-4-hydroxy, $C_7$-$C_9$ branched and linear alkyl esters, a light stabilizer from BASF
Additive OF: Triethyl orthoformate, an additive from Borchers
Substrate: Coil-coating coated test plates, grey, supplier: Heinz Zanders Prüf-Blech-Logistik in Solingen Methods Diethyl fumarate contents were quantitatively determined using a GC method with an internal standard. An Agilent 6890 gas chromatograph with a standard GC capillary (100% polysiloxane phase) and FID detector were used. The injector temperature (split outlet) was 180° C.; helium was used as the carrier gas. The quantitation limit of this method was 300 ppm.

GC-MS analyses were carried out using an Agilent 6890 gas chromatograph and Agilent 5973 mass spectrum detector with standard ionization (electron impact) at 70 eV, a standard GC capillary (100% polysiloxane phase) and split injection at an injector temperature of 250° C.

Evaluation of the gas chromatogram was in area %.

All viscosity measurements were carried out using a Physica MCR 51 rheometer from Anton Paar Germany GmbH (DE) in accordance with DIN EN ISO 3219:1994-10.

Hazen colour index values were determined on a Lico 400 colourimeter from Hach Lange GmbH, Dusseldorf in accordance with DIN EN ISO 6271:2016-05

Amine values were determined titrimetrically in accordance with EN ISO 9702:1998 (perchloric acid method) with the exception that the results were expressed as the amine value. The amine value in mg KOH/g was calculated according to the following equation:

$$\text{Amine value} = \frac{(a-b) \times 5,61}{W}$$

a=Volume of perchloric acid consumed in the main test, in millilitres, c=0.1 mol/l;
b=Volume of perchloric acid consumed in the blank test, in millilitres, c=0.1 mol/l;
W=Weight of sample, in grams The condensation water test was carried out in accordance with DIN EN ISO 6270-2:2017. Blistering was assessed in accordance with DIN EN ISO 4628-2:2016 (n.c.=no change/ bl.=number of blisters/bs.=blister size).

Example 1 (Comparative)

Polyaspartic ester commercially available from Covestro under the name Desmophen NH 1420. Material data:

| | |
|---|---|
| Monoamines of the formula (II) (GC-MS): | 4.0% |
| Diethyl fumarate (GC) | 2.9% by weight |
| Viscosity | 1220 mPas |
| Colour index | 27 APHA |
| Amine value | 201 mg KOH/g |

Example 2

341.8 g of PACM 20 was initially charged at 23° C. under dry nitrogen, with stirring. To this was added dropwise 567.6 g of diethyl maleate, ensuring that the temperature did not rise above 60° C. At the end of the addition, the temperature was adjusted to 45° C. and the mixture was stirred at 45° C. for 2 hours. The mixture was then stored at 23° C. for 7 weeks. The content of diethyl fumarate after storage was 2.7% by weight. Diethyl fumarate was then distilled off at 120° C. and 0.2 mbar. A light-coloured product was obtained that had the following material data:

| | |
|---|---|
| Monoamines of the formula (II) (GC-MS): | 5.3% |
| Diethyl fumarate (GC) | 0.08% by weight |
| Viscosity | 1810 mPas |
| Colour index | 19 APHA |
| Amine value | 203 mg KOH/g |

Testing in Coatings
Preparation of a Coating Base

To the amount of component A shown in table 1 were added the additives and the amount of butyl acetate shown in the table, and the mixture was stirred homogeneously.

Preparation of the Hardener Solution

To the amount of component B shown in table 1 was added the amount of butyl acetate shown, and the mixture was stirred homogeneously.

Coating structure: The substrate was coated with a deep black Permahyd Series 280 basecoat (supplier: Spies Hecker GmbH in Cologne) by means of an air-pressure spraying process using a Sata Jet RP, nozzle 1.3 mm/2.1 bar) and dried for 20 minutes at room temperature (layer thickness of the dry film: 15 µm). 2C clear coats were produced by mixing components A and B immediately before application by stirring for 15 s with a wooden spatula and then applying to the precoated substrate in an air-pressure spraying process using a Sata Jet RP, nozzle 1.3 mm/2.1 bar. Drying was at room temperature (24° C./30% rel. humidity) for 7 days. Brilliant, high-gloss coatings with a layer thickness of 50-60 µm were obtained.

TABLE 1

Composition of the clear coats

| | Example 3 (comparative) | Example 4 (according to the invention) |
|---|---|---|
| Component A | | |
| Desmophen NH 1420 from example 1 | 42.94 | |
| Polyaspartic ester from example 2 | | 42.94 |
| Byk 331 (10% in BA) | 0.07 | 0.07 |
| Tinuvin 384-2 (50% in BA) | 3.53 | 3.53 |
| Additives OF (98%) | 3.00 | 3.00 |
| Butyl acetate | 12.58 | 12.58 |
| Component B | | |
| Desmodur N 3900 (100%) | 27.89 | 28.44 |
| Butyl acetate | 9.99 | 9.44 |
| Sum | 100.00 | 100.00 |

TABLE 2

Results of the condensation water test

| | Example 3 (comparative) | Example 4 (according to the invention) |
|---|---|---|
| Layer thickness in µm | 51 | 63 |
| Gloss 20°/Haze 0 value | 87/16 | 87/12 |

TABLE 2-continued

Results of the condensation water test

| | Example 3 (comparative) | Example 4 (according to the invention) |
|---|---|---|
| Condensation water test after 24 h | n.c. | n.c. |
| Condensation water test after 48 h | n.c. | n.c. |
| Condensation water test after 72 h | n.c. | n.c. |
| Condensation water test after 96 h | 2 bl. bs. 2 | n.c. |
| Condensation water test after 168 h | 1 bl. bs. 2, 1 bl. bs. 5 | n.c. |
| Condensation water test after 192 h | 1 bl. bs. 2, 1 bl. bs. 5 | n.c. |
| Condensation water test after 216 h | 1 bl. bs. 2, 1 bl. bs. 5 | n.c. |
| Condensation water test after 240 h | 1 bl. bs. 2, 1 bl. bs. 5, 2 cracks | 2 bl. bs. 2 |

The comparison coating from example 3 was already showing blistering after 96 h in the condensation water test, whereas the coating according to the invention from example 4 did not show blistering until after 240 h. These results provide evidence that the polyaspartic ester compositions according to the invention are able to achieve significant industrial advantages over conventional coatings.

Coatings are considered to be water-resistant/water-stable (evaluation in accordance with DIN EN ISO 4628-2:2016) if the condensation test (in accordance with DIN EN ISO 6270-2:2017) results in no change in the coating even after 100 hours, preferably even after 150 hours, most preferably even after 200 hours.

TABLE 3

Coating properties of coatings

| Temperature: 24° C. | | Example 4 (according to the invention) | Example 3 (comparative) |
|---|---|---|---|
| Air humidity: 48% | | | |
| Solids content in % at spray viscosity (calc.) | | 74.9 | 81.1 |
| Flow time DIN 4 mm (sec) | 0 h | 16 | 17 |
| | 5' | 17 | 18 |
| | 10' | 18 | 20 |
| | 15' | 19 | 24 |
| | 20' | 20 | 27 |
| | 25' | 22 | 31 |
| | 30' | 25 | 40 |
| Drying (min) | T 1 | 12 | 15 |
| RT | T 3 | 25 | 30 |
| | T 4 | 40 | 45 |
| Layer thickness (µm) | | approx. 50 | approx. 50 |
| Drying (min) | T 1 | immediately | immediately |
| 30'-60° C. | T 3 | 15 | 20 |
| | T 4 | 25 | 30 |
| Layer thickness (µm) | | approx. 50 | approx. 50 |

Comparison of the coating properties shown in table 3 for the comparison coating (example 4) with the coatings according to the invention (examples 3) demonstrates that the coatings according to the invention dry more rapidly while having an unchanged pot life.

The invention claimed is:

1. A process for producing a coating on a substrate comprising:
   i) applying a two-component coating composition to at least part of a substrate to be coated; and
   ii) curing the coating composition from step i), wherein the two-component coating composition comprises
a) at least one polyaspartic ester-containing component A;
b) at least one polyisocyanate component B;
c) optionally one or more components C that are different from A and are reactive towards isocyanate groups;
d) at least one water scavenger and/or hydrolysis stabilizer (component D1); and
optionally other auxiliaries and additives (component D2), wherein component A comprises
one or more polyaspartic esters of the general formula (I)

in which
X is an m-valent organic radical, optionally containing one or more heteroatoms, as can be obtained by removing the primary amino groups from a corresponding polyamine that has (cyclo) aliphatically or araliphatically attached primary amino groups and is in the molecular weight range from 60 to 6000 g/mol, and which may contain further functional groups that are reactive towards isocyanate groups and/or that are inert at temperatures of up to 100° C.,
R1 and R2 are identical or different organic radicals each having 1 to 18 carbon atoms,
m is an integer >1,
and one or more polyaspartic esters having a primary amino group that are of the general formula (II)

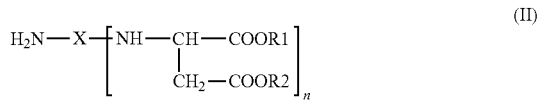

in which
n is m-1,
X and radicals R1 and R2 have the meanings defined above, wherein a proportion of compounds of the general formula (II) corresponds to ≥4% to ≤20% of a total area measured as area % in a gas chromatogram (GC), wherein the total area corresponds to a sum of the areas in the GC of compounds of the two general formulas (I) and (II) and is equal to 100% and wherein dialkyl fumarates are present in component A in amounts from ≥0.01% to ≤1.2% by weight based on a total weight of component A, and wherein the coating is a clear coat.

2. The process according to claim 1, wherein the clear coat is a refinishing clear coat.

3. The process according to claim 1, wherein the proportion of compounds of the general formula (II) is >4% of the total area in the GC (measured as area % in the gas chromatogram).

4. The process according to claim 1, wherein the proportion of compounds of the general formula (II) is ≤15% of the total area in the GC (measured as area % in the gas chromatogram).

5. The process according to claim 1, wherein dialkyl fumarates are present in component A in an amount from ≥0.01% to ≤1% by weight based on the total weight of component A.

6. The process according to claim 1, wherein dialkyl fumarates are present in component A in an amount from ≥0.01% to ≤0.1% by weight based on the total weight of component A.

7. A substrate coated with a coating obtained in accordance with the process according to claim 1.

8. The substrate coated with a coating according to claim 7, wherein the clear coat is a refinishing clear coat.

* * * * *